(12) United States Patent
Kung et al.

(10) Patent No.: US 6,563,797 B1
(45) Date of Patent: May 13, 2003

(54) IP VOICE CALL SURVEILLANCE THROUGH USE OF NON-DEDICATED IP PHONE WITH SIGNAL ALERT PROVIDED TO INDICATE CONTENT OF INCOMING CALL PRIOR TO AN ANSWER AS BEING A MONITORED CALL

(75) Inventors: Fen-Chung Kung, Bridgewater, NJ (US); Jesse Eugene Russell, Piscataway, NJ (US); Anish Sankalia, Iselin, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/376,454

(22) Filed: Aug. 18, 1999

(51) Int. Cl.[7] ............................ H04L 12/28; H04M 3/22
(52) U.S. Cl. ...................... 370/252; 370/392; 370/401; 379/32.01; 379/35
(58) Field of Search .................................. 370/389–390, 370/392, 352, 259–264, 401, 465–469, 252; 379/67.1, 70, 133, 88.01, 88.02, 88.19, 32.01, 35, 207.02, 219, 220.01; 455/67.1, 67.7

(56) References Cited

U.S. PATENT DOCUMENTS

| | | | |
|---|---|---|---|
| 5,956,717 A | * | 9/1999 | Kraay et al. ................ 379/188 |
| 6,115,393 A | | 9/2000 | Engel et al. |
| 6,122,357 A | * | 9/2000 | Farris et al. ........... 379/207.02 |
| 6,229,887 B1 | * | 5/2001 | Albers et al. ........... 379/207.02 |
| 6,233,313 B1 | * | 5/2001 | Farris et al. ........... 379/112.01 |
| 6,289,025 B1 | | 9/2001 | Pang et al. |
| 6,324,279 B1 | * | 11/2001 | Kalmanek, Jr. et al. .... 370/401 |

* cited by examiner

Primary Examiner—Wellington Chin
Assistant Examiner—Maikhanh Tran
(74) Attorney, Agent, or Firm—Banner & Witcoff, Ltd.

(57) ABSTRACT

Surveillance of IP telephony may be performed through the use of conventional telephone equipment, according to principles of the invention while preventing giving indication to the monitored phone by alerting the user of the monitoring phone to such surveillance use prior to pick up by an agent for engagement of the monitoring phone in response to the alert. Such alerts may assume many forms such as ringing, visual indicators, data readouts, activating ancillary equipment, various flags, etc. This alert prior to surveillance is distinct from alerts used for normal non-surveillance calls, which the monitoring phone is capable of receiving.

5 Claims, 2 Drawing Sheets

IP VOICE CALL SURVEILLANCE THROUGH USE OF NON-DEDICATED IP PHONE WITH SIGNAL ALERT PROVIDED TO INDICATE CONTENT OF INCOMING CALL PRIOR TO AN ANSWER AS BEING A MONITORED CALL

FIELD OF THE INVENTION

This invention relates to surveillance of telephone calls over a public communications link and is particularly concerned with providing assistance for such surveillance to law enforcement agencies. It particularly concerns surveillance of voice over IP (i.e., cable) networks.

BACKGROUND OF THE INVENTION

Requirements for enabling surveillance of electronic communications have been enacted into public law (e.g., Public Law 103–414 enacted Oct. 25, 1994; CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new forms of communication. New technologies require extension of CALEA to the new phone system technologies. With the advent of IP telephony it is desirable to provide surveillance capabilities for application to IP telephony.

One of the impediments to surveillance is the necessity of having dedicated equipment to perform the monitoring function. It would be useful to perform such surveillance of a targeted phone with non-dedicated telephone equipment. With use of such non-dedicated equipment it is desirable to distinguish normal calls from surveillance calls.

SUMMARY OF THE INVENTION

Surveillance of IP telephony may be performed through the use of conventional telephone equipment, according to principles of the invention while preventing giving indication to the monitored phone of the monitoring activity. The user of the monitoring phone is alerted to such surveillance use prior to pick up, by an agent for engagement of the monitoring phone, in response to the alert. Such alerts may assume many forms such as ringing, visual indicators, data readouts, activating ancillary equipment, various flags, etc. This alert prior to surveillance is distinct from alerts used for normal non-surveillance calls, which the monitoring phone is capable of receiving.

In an IP telephone environment, a cable modem bank (CMB) or an IP Phone intercept List (IP-PIL) lists the IP phones to be monitored and responds when one of those listed phones to be monitored becomes active. In response to notification by an IP Address Mapping Check Point with the IP-PIL, a distinctive alert is delivered to the monitoring phone, which indicates the call's existence and the monitoring purpose to be performed. The IP Address Mapping Check Point and associated WatchDog program alerts the monitoring phone when the monitored phone is in the process of receiving a call. In both instances the monitoring phone is controlled not to be active until both parties of the monitored call are connected and active.

DETAILED DESCRIPTION

Figure 1:
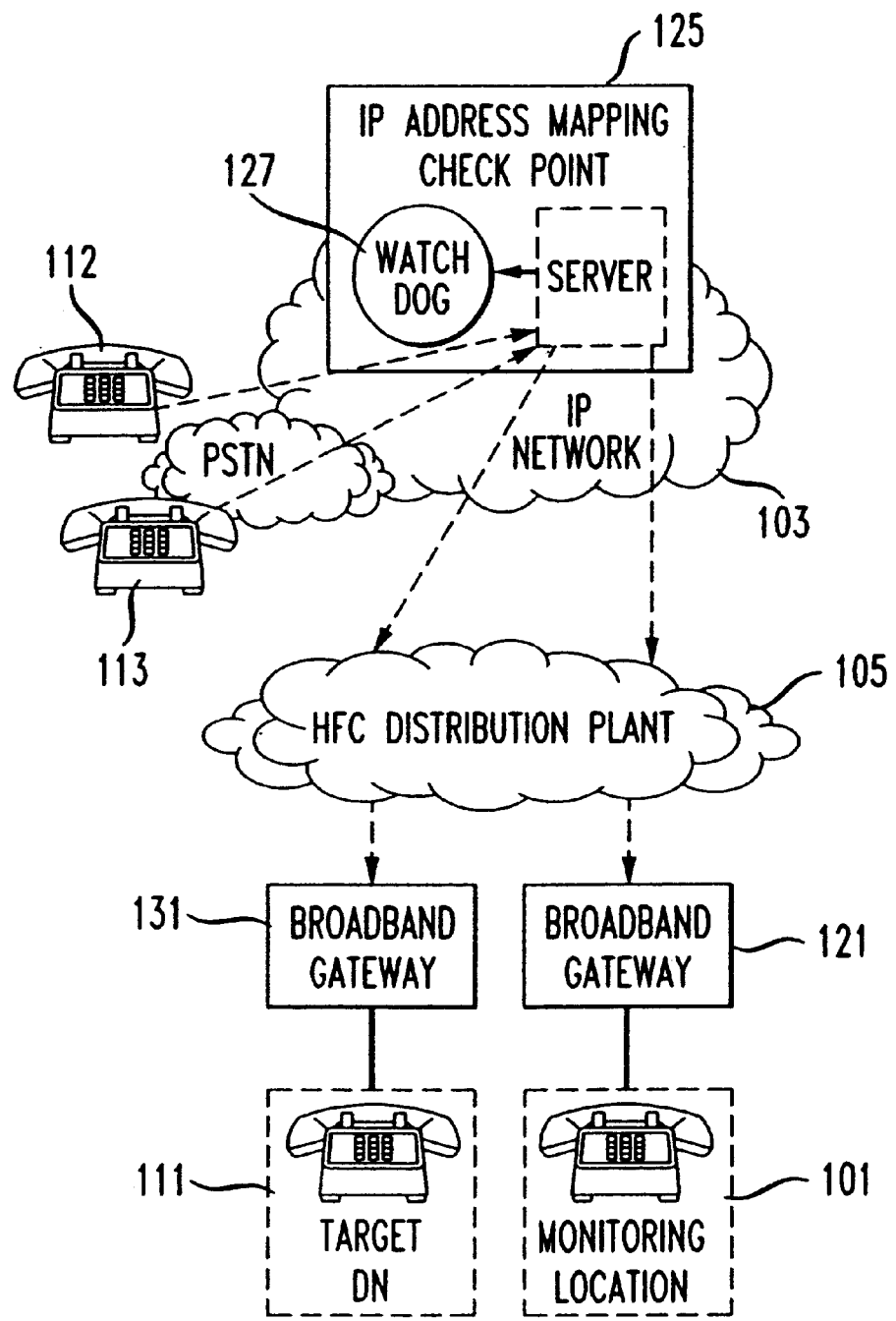
FIG. 1 is a block schematic of a surveillance system incorporating the principles of the invention.

A monitoring station/location 101 is shown, in the FIG. 1, as connected, via a broadband gateway 121, to a backbone Internet Protocol (IP) network 103 via the connection provided by an Hybrid Fiber Coax (HFC) distribution plant 105. HFC distribution plant 105 is a distribution cabling arrangement employing both optical fiber and coaxial cable. Optical fiber is connected to he backbone and coaxial cable is connected to the terminating devices. The optical fiber and coaxial cable are joined by an electro-optical connection. The objective is to provide higher bandwidth to the terminating devices at a lower cost then by using optical fiber alone.

The target telephone/DN 111 to be monitored is also connected, via a broadband gateway 131, to the backbone IP network 103 via the same HFC distribution plant 105. Included with the backbone IP network is an IP address mapping Check Point (IP-AMCP) 125, which provides numbers for various devices, connected to the backbone network 103. The IP-AMCP 125 may be embodied in a server within or connected to the network. It has the capability, through programming, of examining packet contents and authenticating users of the network. With specific WatchDog software 127 the IP-AMCP identifies specific activity from certain designated telephone stations 112 and/or 113 at a specified DN or IP address and can replicate/duplicate the packets of that phone and the IP target telephone 111 which replicated/duplicated packets are forwarded to the monitoring station 101.

The designated telephone stations 112 and 113 may be connected to the IP network 103 or to the Public Switched Telephone Network (PSTN) 115, as shown, and be connected to the target DN 111. The monitoring station 101 may not be dedicated to the surveillance function and hence some indication of its use is provided. The IP-AMCP 125 through its WatchDog 127 determines when an incoming call to the monitoring station is a surveillance call of the target DN 111. It uses this determination to provide an alerting signal to the monitoring station 101 so that the answerer is knowledgeable that the incoming call is a monitoring of a target IP telephone. In one aspect the gateway coupling the monitoring IP telephone to the IP network is a source of distinctive ringing signals or in the alternative provides an audio announcement.

Figure 2:
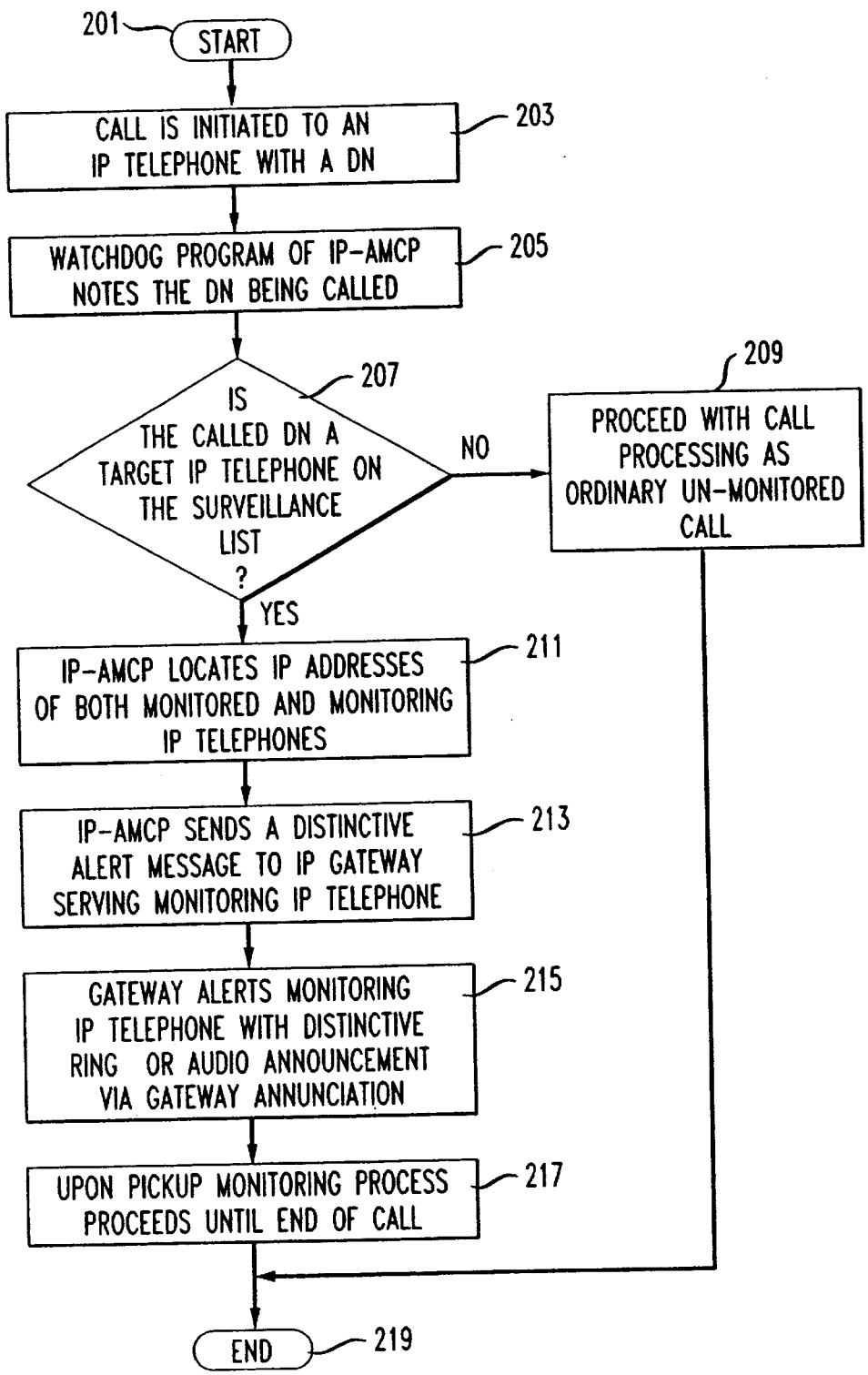
FIG. 2 is a flow chart of the process by which the invention is performed in the system of FIG. 1.

The procedure in providing such an indicating alert is shown in the flow chart of FIG. 2 It starts, as indicted in block 203, with the initiation of a call to an IP telephone having a known DN. A WatchDog program associated with the IP-AMCP notes that the call is being initiated as per block 205. In decision block 207 an inquiry asks if the called DN is one of a list of IP telephone under surveillance. If it is not the flow proceeds per the instructions of block 209 to handle the call as a non-monitored call and the process ends at terminal 219.

If the DN called is on the surveillance list the process as per block 211 locates the addresses of the calling and called DNs in the IP-AMCP. According to the instructions of block 213 the IP-AMCP sends a distinctive alert message to a gateway terminal connecting the target IP telephone to the IP network and also to the gateway serving the monitoring IP telephone. In the instance of the gateway of the monitoring IP telephone the gateway in one embodiment rings the monitoring IP telephone with a distinctive ring, as per block 215, to indicate to the party answering the phone that this is a call connection for the purpose of eavesdropping in on the target IP telephone. In an alternative arrangement the gateway may have a facility to provide this information by means of an audio output. The monitoring process then proceeds, as per block 217, until termination of the call where upon the process ends at terminal 219.

The following applications are being filed concurrently with the present application and are incorporated herein by reference. All applications have the same inventors (e.g., Kung, Russell, Sankalia and Wang):

1999-0185 (U.S. patent application Ser. No. 09/375,754) Monitoring Selected IP Voice Calls Through Activity of a WatchDog Program at an IP-Addressing Mapping Checking Point; U.S. Ser. Number 09/376,454 PATENT APPLICATION 1999-0186 (U.S. patent application Ser. No. 09/375,750) Monitoring IP Voice Calls Under Command of a PSTN Phone;

1999-0187 (U.S. patent application Ser. No. 09/376,782) Flexible Packet Technique for Monitoring Calls Spanning Different Backbone Networks;

1999-0188 (U.S. patent application Ser. No. 09/376,783) Multiple Routing and Automatic Network Detection of a Monitored Call from an Intercepted Targeted IP Phone to Multiple Monitoring Locations;

1999-0189 (U.S. patent application Ser. No. 09/376,459) Secure Detection of an Intercepted Targeted IP Phone from Multiple Monitoring Locations;

1999-0190 (U.S. patent application Ser. No. 09/376,462) Automatic IP Directory Number Masking and Dynamic Packet Routing for IP Phone Surveillance.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What we claim is:

1. In an IP voice call surveillance system using non-dedicated monitoring stations a method of indicating monitoring purpose prior to an answer to an incoming call, comprising the steps of:

collecting information concerning call initiations with respect to a telephone device contained within an IP network through the use of an IP Address Mapping Check Point (IP-AMCP);

identifying the call initiations associated with a target IP telephone to be monitored by means of Watchdog activity by determining if a called DN is on a surveillance list;

determining the address of a monitoring IP telephone through the IP-AMCP and sending a distinct alert to a gateway connected to the monitoring IP telephone; and signaling the distant alert to a user of the monitoring IP telephone to indicate that a surveillance call is being set up.

2. The method of claim 1 wherein the step of sending a distinct alert, comprises a step of:

sending a distinctive ringing signal to alert a user of the monitoring station.

3. The method of claim 1 wherein the step of sending a distinct alert, comprises a step of:

providing an audio signal to alert a user of the monitoring station.

4. The method of claim 1, including a step of:

surveying all DNs called through the use of a WatchDog program with the IP-AMCP and having a database of DNs being monitored.

5. The method of claim 1, including a step of: processing all activity of the monitoring IP telephone through a broadband gateway coupling it to an IP network.

* * * * *

UNITED STATES PATENT AND TRADEMARK OFFICE
CERTIFICATE OF CORRECTION

PATENT NO. : 6,563,797 B1 Page 1 of 1
DATED : May 13, 2003
INVENTOR(S) : Fen-Chung Kung et al.

It is certified that error appears in the above-identified patent and that said Letters Patent is hereby corrected as shown below:

Column 4,
Line 23, "distinct" has been replaced with -- distant --.

Signed and Sealed this

Twelfth Day of August, 2003

JAMES E. ROGAN
*Director of the United States Patent and Trademark Office*